(12) United States Patent
Von Keitz

(10) Patent No.: US 9,816,653 B2
(45) Date of Patent: Nov. 14, 2017

(54) BREAKAWAY COUPLING

(71) Applicant: Andreas Von Keitz, Diez (DE)

(72) Inventor: Andreas Von Keitz, Diez (DE)

(*) Notice: Subject to any disclaimer, the term of this patent is extended or adjusted under 35 U.S.C. 154(b) by 0 days.

(21) Appl. No.: 14/761,794

(22) PCT Filed: Jan. 3, 2014

(86) PCT No.: PCT/EP2014/050050
§ 371 (c)(1),
(2) Date: Jul. 17, 2015

(87) PCT Pub. No.: WO2014/111278
PCT Pub. Date: Jul. 24, 2014

(65) Prior Publication Data
US 2015/0362110 A1  Dec. 17, 2015

(30) Foreign Application Priority Data
Jan. 17, 2013 (DE) .................. 10 2013 100 483

(51) Int. Cl.
| | |
|---|---|
| *F16L 23/02* | (2006.01) |
| *F16L 37/086* | (2006.01) |
| *F16L 29/04* | (2006.01) |
| *F16L 55/10* | (2006.01) |
| *F16L 23/00* | (2006.01) |
| *F16L 23/16* | (2006.01) |

(52) U.S. Cl.
CPC ........... *F16L 37/086* (2013.01); *F16L 23/003* (2013.01); *F16L 23/02* (2013.01); *F16L 23/162* (2013.01); *F16L 29/04* (2013.01); *F16L 55/1015* (2013.01)

(58) Field of Classification Search
CPC ...................................... F16L 29/04
USPC ..................................... 285/1, 312
See application file for complete search history.

(56) References Cited

U.S. PATENT DOCUMENTS

| 1,369,304 | A | | 2/1921 | Schram | |
|---|---|---|---|---|---|
| 2,952,482 | A | * | 9/1960 | Torres | F16L 37/121 285/1 |

(Continued)

FOREIGN PATENT DOCUMENTS

| CN | 1037764 A | 12/1989 |
|---|---|---|
| CN | 2078410 U | 6/1991 |

(Continued)

OTHER PUBLICATIONS

English translation of Chinese Office Action dated Jan. 25, 2016 for corresponding Chinese Patent Application No. 201480005137.4, 13 pages.

(Continued)

*Primary Examiner* — David E Bochna
(74) *Attorney, Agent, or Firm* — Ohlandt, Greeley, Ruggiero & Perle, L.L.P.

(57) ABSTRACT

There is provided a breakaway coupling between two lines. The first coupling half possesses an opened jaw, which is formed by catch pieces of the short lever arms of dual-arm catch levers, which are pre-stressed in the closing direction by compression springs, and in this way engage behind oblique surfaces of an end flange of the second coupling half. When a predetermined pulling force on the lines is exceeded, the breakaway coupling disengages.

12 Claims, 2 Drawing Sheets

(56) References Cited

U.S. PATENT DOCUMENTS

| | | | |
|---|---|---|---|
| 3,454,047 A * | 7/1969 | Johnston | F16L 37/121 |
| | | | 285/1 |
| 4,392,513 A * | 7/1983 | Parrish | F16L 55/1015 |
| | | | 285/1 |
| 5,095,947 A | 3/1992 | Weh et al. | |
| 5,355,909 A * | 10/1994 | Smith, III | F16L 29/04 |
| | | | 137/614.04 |
| 5,564,417 A | 10/1996 | Chance | |
| 5,564,471 A * | 10/1996 | Wilder | F16L 55/1015 |
| | | | 285/1 |
| 5,699,822 A * | 12/1997 | Bodhaine | F16L 29/04 |
| | | | 285/2 |
| 5,826,610 A * | 10/1998 | Bodhaine | F16L 29/04 |
| | | | 137/614.04 |
| 6,050,297 A | 4/2000 | Ostrowski | |
| 6,269,836 B1 * | 8/2001 | Monti | F16L 55/1015 |
| | | | 285/1 |
| 7,401,625 B2 | 7/2008 | Casier | |
| 7,401,626 B1 * | 7/2008 | Plattner | F16L 37/32 |
| | | | 137/614.03 |

FOREIGN PATENT DOCUMENTS

| | | |
|---|---|---|
| DE | 9114005 U1 | 1/1992 |
| DE | 102005006088 A1 | 8/2006 |
| DE | 102005011601 A1 | 9/2006 |
| EP | 0517127 A1 | 12/1992 |
| GB | 2145183 | 3/1985 |
| JP | S58178087 | 10/1983 |
| JP | 2005337403 | 12/2005 |
| WO | 2006084447 | 8/2006 |

OTHER PUBLICATIONS

English translation of Written Opinion of the International Searching Authority dated Apr. 4, 2014 for corresponding PCT/EP2014/050050, 7 pages.

English translation of International Preliminary Report on Patentability dated Jul. 30, 2015 for corresponding PCT/EP2014/050050, 9 pages.

German Office Action dated Jul. 19, 2013 for corresponding German Patent Application No. 10 2013 100 483.0, with English translation, 9 pages.

English translation of International Search Report dated Apr. 4, 2014 for corresponding PCT/EP2014/050050, 2 pages.

* cited by examiner

BREAKAWAY COUPLING

CROSS-REFERENCE TO A RELATED APPLICATION

The present application is a continuation application of PCT Application No. PCT/EP2014/050050, filed Jan. 3, 2014, which claims priority based on German Application No. DE102013100483.0, filed Jan. 17, 2013, both of which are incorporated herein by reference in their entireties.

BACKGROUND OF THE DISCLOSURE

1. Field of the Disclosure

The invention relates to a coupling device as an emergency disconnect safety mechanism between two lines for delivery that are provided with fluid barriers for blocking the lines in the case of forced separation.

2. Description of the Related Art

Delivery lines are usually connected to one another by means of actuatable couplings, for example, in order to be able to withdraw a fluid load from a tank or to be able to supply a fluid load into the tank, and are then subsequently disconnected from one another. Such actuatable coupling devices are locked together when the line run formed for fluid delivery is utilized.

In practice, the case is frequently encountered that one of the coupling halves is disposed in stationary manner and the other coupling half is connected to a vehicle, i.e., is disposed in movable manner. "Vehicle" is to be understood here in the broadest sense and also comprises cars of all types, ships, or aircraft. If the vehicle moves during the load transfer, it can happen that the actuatable coupling or the line run is broken apart and is thus destroyed.

In order to avoid such a breakdown, in practice, an emergency disconnect safety mechanism is applied, which is triggered on the line when a predetermined tensile or pulling force occurs, or a predetermined breakaway point is severed, before damage occurs in the line run.

An emergency disconnect safety coupling is shown in DE 91 14 005 U1. The two coupling halves are held together by means of retaining ring segments, which engage from outside into annular grooves of connection edges of the coupling halves, and in turn are supported via dual-arm support levers, which are placed under tension of compression springs. If too great a tension or pull is exercised on the two coupling halves, the retaining ring segments disengage, countering the force of the compression springs on the support levers, since the retaining ring segments are pressed radially outward by wedging forces. There is the danger of clamping here, however.

SUMMARY OF THE DISCLOSURE

The object of the invention is based on providing a breakaway coupling that is designed as relatively compact and that makes it possible to adjust the separating force.

The stated object is achieved by a breakaway coupling with the features of claim 1.

The breakaway coupling comprises two coupling halves, each of which contains line ends with self-closing fluid barriers, which are removed during coupling to thus enable the passage of fluid through the lines that are coupled together. Each coupling half has an end flange or collar with sealing surface that tightly seals the coupling halves when they are coupled to one another. One of the coupling halves has two or more catch levers cooperating with two pivot points that can be pivoted in respective radial planes relative to the coupling halves and these catch levers have lever arms of unequal length. The long lever arms are each placed under the effect of a compression spring associated therewith and the short lever arms are designed with catch pieces that engage on oblique surfaces of the other coupling half when the coupling halves are coupled with one another. The contact force is determined by the associated compression spring and is thus selectable. If a tensile or pulling force that exceeds the level defined by the compression springs is exercised on the coupling device in the coupling state, the shorter lever arm with catch piece will be pivoted in the direction of opening the coupling device and the coupling connection will be released. The fluid barriers are automatically closed in this process.

According to an advantageous embodiment of the invention, the end flanges or collars provided with sealing surfaces are provided on their outer periphery with oblique surfaces with which the short lever arm with the catch piece engages.

The coupling half with the catch levers advantageously has a housing flange with radial guides for the ends of the longer lever arm of the catch lever. The guides can be designed as guide slots that lead into recesses in the housing flange in which the compression springs of the lever are disposed. The coupling half with the catch levers can have an annular housing part that supports and covers the catch levers in the region of their pivot surfaces. The annular housing part is appropriately connected to the housing flange or to the body of the housing by means of axis-parallel struts or braces and serves for forming one of the pivot points of the catch levers, pivot points that form the support points of the catch levers when holding together the two coupling halves. These pivot points are appropriately designed as front faces of adjusting screws, in order to depress the longer lever arms of the catch levers as a mounting aid, thus to pivot the short lever arms with the catch pieces radially outward, so that the coupling jaw is opened. In this opened state, the coupling partners can be brought into the coupling position, according to which the adjusting screws are displaced radially outward, in order to close the coupling jaw and to complete the coupling engagement.

BRIEF DESCRIPTION OF THE DRAWINGS

An example of embodiment of the invention is described on the basis of the drawing. Here.

DETAILED DESCRIPTION OF THE PREFERRED EMBODIMENT

Figure 1:
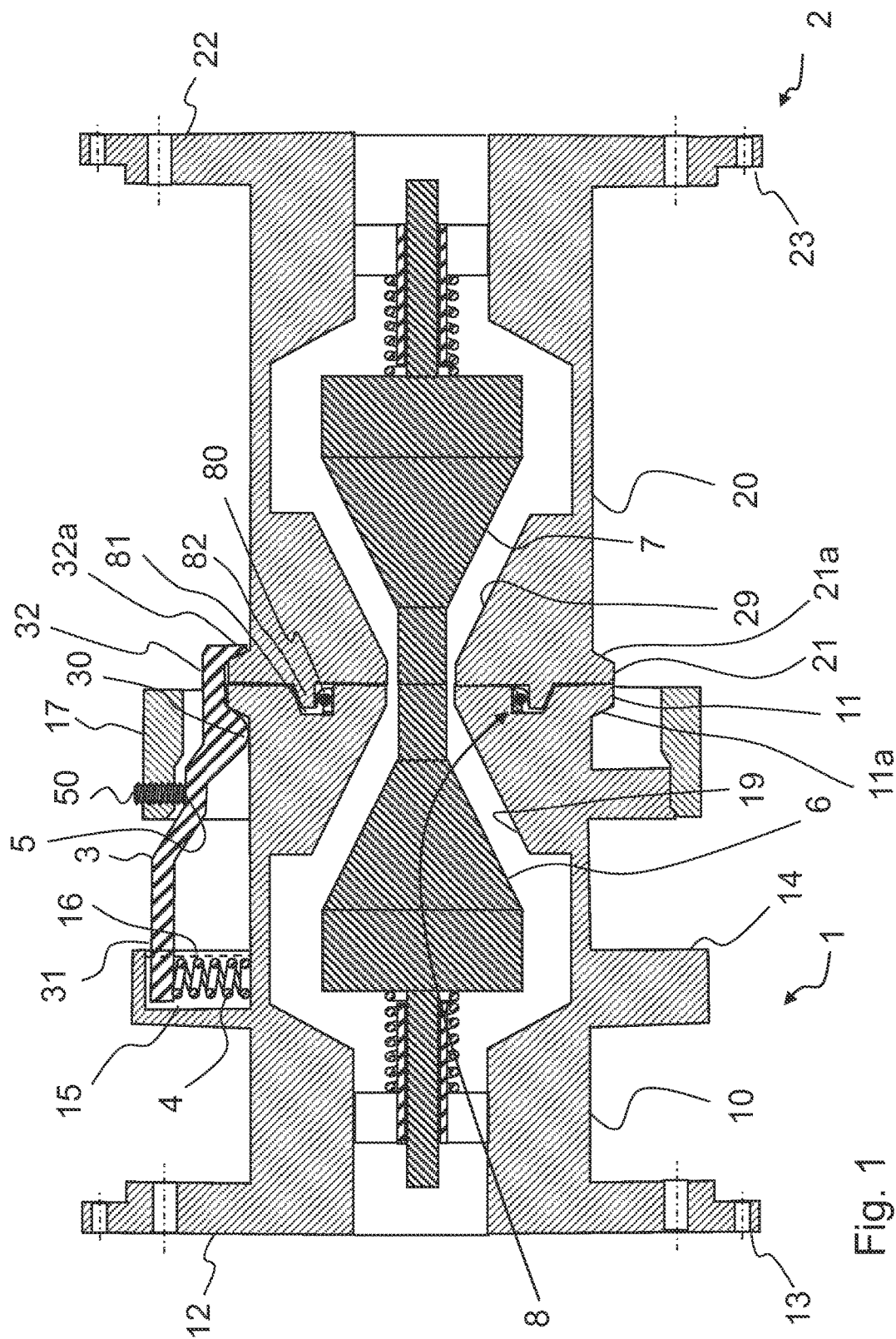
FIG. 1 shows a breakaway coupling in the coupled state, sectioned longitudinally.

The breakaway coupling contains a first coupling half 1 and a second coupling half 2, which form the respective ends of lines, for example hoses, which are not shown. Each coupling half has a tube-shaped housing 10 or 20, which is provided at its opposing ends with an end flange or collar 11 or 21. In order to remain sealed during operation, a centering and sealing device 8 is provided, which comprises a recess 81 on the side of the flange 11 and a projection 82 on the side of the flange 21. The recess 81 and the projection 82 have encircling conical surfaces that are fitted together in order to center the flange or collar 11, 21 and thus the housing 10, 20 in assembling the coupling halves 1, 2. In the intermediate space remaining between projection 82 and recess 81, a seal 80, for example an O-ring or an expansion seal is inserted, which is applied to an axial surface of the projection 82 in order to seal together the housings 10, 20. On its radial periphery, the end flange or collar 21 also has one or more oblique surfaces 21a, which can be composed of an encircling conical surface or also composed of individual ring segment pieces. The end flange or collar 11 can be designed symmetrically to the end flange or collar 21 with respect to its configuration having oblique surfaces, i.e., it can have an oblique surface 11a.

The respective coupling housing 10 or 20 can be provided on its ends with connection flanges 12 or 22, for example, in order to connect secondary lines. The connection flanges 12 and 22 bear openings 13 or 23, which can be aligned flush with one another, in order to lead rods with clamping thread through them, which is useful when assembling the breakaway coupling.

The coupling half 1 comprises another housing flange 14, which is provided with a series of radially aligned housing recesses 15 that open outwardly via slots 16. A plurality of dual-arm catch levers 3 are provided, corresponding to the number of recesses 15 or slots 16, these levers extending inwardly with slight incline in the longitudinal direction of the breakaway coupling. Each dual-arm catch lever 3 has a roller body-pivot surface 30, a longer lever arm 31, and a shorter lever arm 32. The shorter lever arm 32 is provided with a catch piece 32a, the shape of which is fitted to the oblique surface 21a of the end flange 21. The end of the longer lever arm 31 is guided in housing 10 or slot 16 associated with this housing and is placed under the action of a compression spring 4, which engages the catch piece 32a of the respective lever 3 on the oblique surface 21a. This results due to radial support at pivot points 5, which are introduced on the inside of an annular housing part 17. The levers 3 are distributed by disposing them symmetrically around the periphery of the breakaway coupling and are pre-stressed in the closing direction. The respective roller body-pivot surfaces 30 thereby are applied to allocated bearing depressions in the oblique surface 11a. Since the pre-stressing makes difficult the mounting of the breakaway coupling in the coupled state, the pivot points 5 are designed as the front faces of adjusting screws 59 for depressing the longer lever arms 3, whereby the coupling jaw, which is formed by the shorter lever arms 32, is opened and the entry of the end flange or collar 21 of the second coupling half 2 into the coupling jaw is facilitated. The adjusting screws 50 are otherwise held in radial screw holes of the annular housing part 17.

For the support of levers 3 in the vicinity of their pivot surface 30 there is provided the annular housing part 17, which is connected via struts 18 to the body of the housing flange 14 and surrounds the catch levers 3 in the region of their pivot surfaces 30 in a supporting manner. For this purpose, the catch levers 3 between pivot surface 30 and catch piece 32a are designed to conform to the radial edge of the abutting end flanges or collars 11, 21. This radial edge has two oblique surfaces 11a, 21a, which are inclined relative to one another and which can be formed as conical surfaces.

Figure 2:
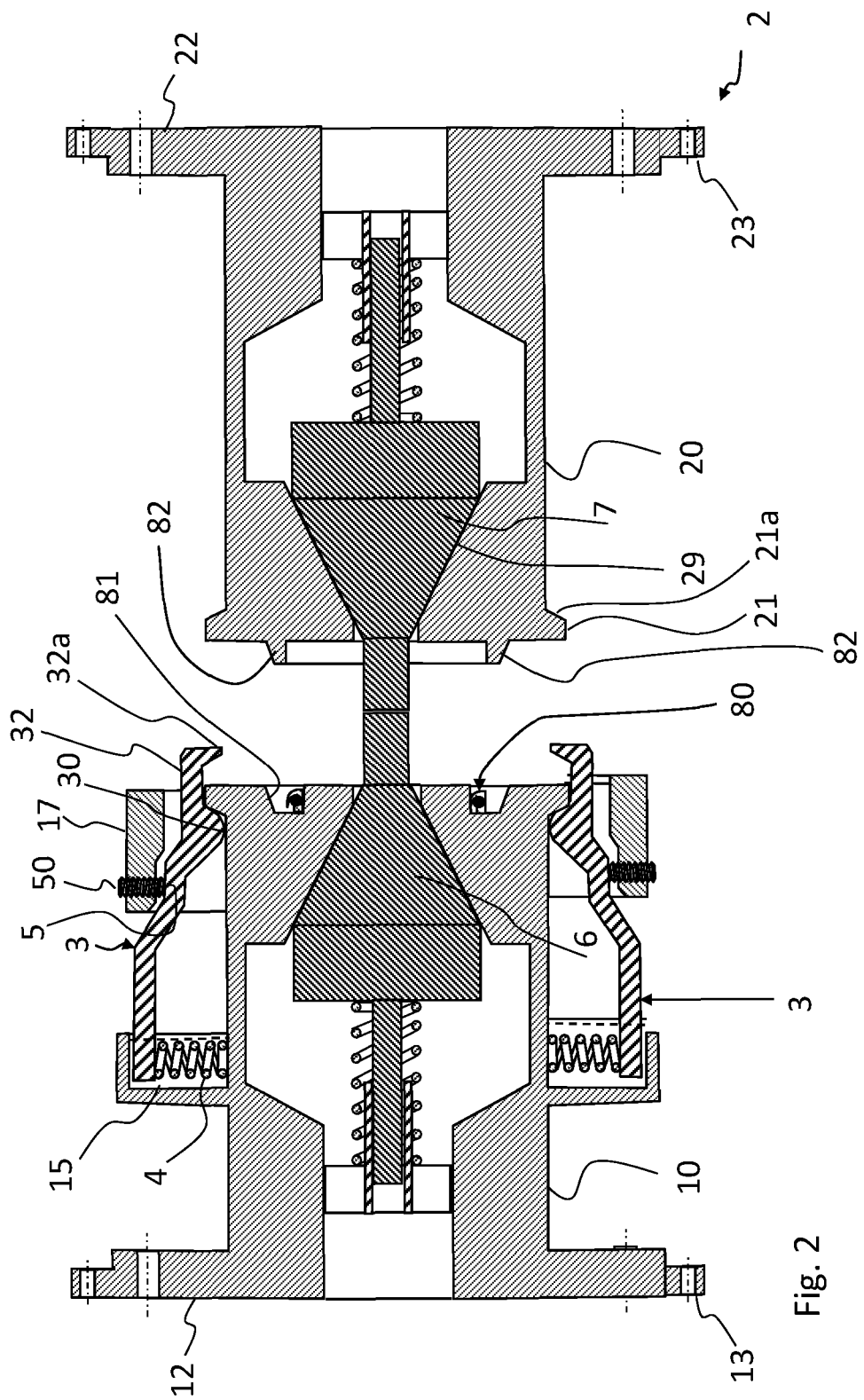
FIG. 2 shows the coupling device in the released state.

The inside of the housing 10 or 20 tapers in order to form system sealing surfaces 19 or 29, which work together with conical fluid barriers 6 or 7. The fluid barriers 6 or 7 are elastically pre-stressed in the direction of their sealing surfaces 19 or 29, as is known in and of itself and need not be described in more detail. If the coupling halves 1, 2 are coupled to one another (FIG. 1), the fluid barriers 6, 7 push against each other and assume a position in which they are raised off of their sealing seats 19 or 29. When the coupling halves are separated, (FIG. 2) the fluid barriers 6 or 7 lie on their sealing seats 19 or 29 and block the line with which they are associated.

The novel breakaway coupling can easily be assembled again after a release process. The adjusting screws 50 are rotated inward and thereby pivot the catch levers 3 into a position in which the catch pieces 32a assume the position of an opened coupling jaw. By so doing, the end flange or collar 21 of the second coupling half 2 can be moved into this opened jaw without obstruction. In this case, guide rods (not shown) can be used, which are pushed through the openings 13, 23, and are provided with clamping thread, in order to guide the two coupling halves together. If the two coupling parts 1, 2 have assumed their correct positions relative to one another, the adjusting screws 50 are rotated outwardly, so that the catch levers 3 can assume their catch position, in which the catch pieces 32a engage behind the oblique surfaces 21a.

If the two coupling halves 1, 2 are coupled together and a tensile or pulling force occurs between the coupling halves that is greater than the releasing force of the coupling, then the levers 3 are pivoted around the pivot points 5 against the force of the compression springs 4, and the catch pieces 32a are released from the oblique surfaces 21a. The two lines that are coupled separate without damage. With the separation of the coupling halves from one another, the fluid barriers 6, 7 are also automatically activated and block their respective line at the associated end flanges 19 or 29, respectively.

The coupling halves can be joined together again, as described.

The invention thus relates to a breakaway coupling between two lines. The first coupling half 1 possesses an opening jaw, which is formed by catch pieces 32a of the short lever arms 32 of the dual-arm catch levers 3, which are pre-stressed in the closing direction by compression springs 4, and in this way engage behind oblique surfaces 21a of an end flange 21 of the second coupling half 2. When a predetermined pulling force on the lines is exceeded, the breakaway coupling disengages.

The invention claimed is:

1. A breakaway coupling for the emergency separation of two lines, comprising:
 a first coupling half having a support member and a first housing that forms a first line end with a first self-closing fluid barrier, the first housing having a first end flange or collar provided with a first oblique surface, the support member extending around the first housing and forming pivot points;
 a second coupling half having a second housing that forms a second line end with a second self-closing fluid barrier, the second housing having a second end flange or collar provided with a second oblique surface; and
 two or more levers, which are mounted on the first coupling half with the pivot points supporting the levers and defining a longer lever arm and a shorter lever arm on each lever, wherein each longer lever arm is pivoted radially outward by a compression spring and the shorter lever arm is pivoted radially inward;
 wherein each shorter lever arm, has a catch piece that engages on the first and second oblique surfaces in a coupled condition, and
 wherein, in case of an emergency defined by an excessively great pulling force on the coupling halves, the levers pivot around their pivot points and release the catch pieces from the first and second oblique surfaces.

2. The breakaway coupling according to claim 1, wherein the end flanges or collars, in the coupled condition lying next to one another, form a common radial edge of the breakaway coupling, and wherein the catch piece of each shorter lever arm embraces the common radial edge.

3. The breakaway coupling according to claim 2, wherein the first end flange or collar is provided with a conical surface as the first oblique surface which, when viewed from inside to outside, is inclined in a direction opposite to a second conical surface as the second oblique surface of the second end flange or collar, and wherein the catch pieces conform to the common radial edge.

4. The breakaway coupling according to claim 1, wherein the pivot points are disposed on an annular housing part of the first housing.

5. The breakaway coupling according to claim 4, wherein the annular housing part is connected to the housing flange via struts.

6. The breakaway coupling according to claim 1, wherein the pivot points are formed by adjusting screws which, when screwed in a radial direction of the first housing, compress the compressing springs.

7. The breakaway coupling according to claim 6, wherein the first oblique surface has a bearing depression which, together with a roller body on the lever, forms a pivot surface, the adjusting screws being arranged to act on the longer lever arms and have the roller body turn on the bearing depression in order to press together the compression springs and pivot the catch piece radially outward.

8. The breakaway coupling according to claim 1, wherein the levers each have a lever end opposite to the catch piece and the first coupling half has a housing flange with radial guides for the lever ends.

9. The breakaway coupling according to claim 8, wherein the housing flange is provided with recesses that receive the compression springs.

10. The breakaway coupling according to claim 1, further comprising a centering and sealing device that is formed by a recess and a seal disposed in one of the first and second coupling halves and is formed also by a projection on the other of the first and second coupling halves.

11. The breakaway coupling according to claim 1, wherein the first and the second coupling halves each has a connection flange for secondary lines.

12. The breakaway coupling according to claim 11, wherein the connection flanges are each provided with openings that are aligned in pairs.

* * * * *